United States Patent
Fan et al.

(10) Patent No.: US 10,776,936 B2
(45) Date of Patent: Sep. 15, 2020

(54) POINT CLOUD MATCHING METHOD

(71) Applicant: Nokia Technologies Oy, Espoo (FI)

(72) Inventors: Lixin Fan, Tampere (FI); Xiaoshui Huang, Ultimo (AU); Qiang Wu, Ultimo (AU); Jian Zhang, Ultimo (AU)

(73) Assignee: Nokia Technologies Oy, Espoo (FI)

( * ) Notice: Subject to any disclaimer, the term of this patent is extended or adjusted under 35 U.S.C. 154(b) by 118 days.

(21) Appl. No.: 16/301,407

(22) PCT Filed: May 11, 2017

(86) PCT No.: PCT/IB2017/052777
§ 371 (c)(1),
(2) Date: Nov. 13, 2018

(87) PCT Pub. No.: WO2017/199141
PCT Pub. Date: Nov. 23, 2017

(65) Prior Publication Data
US 2019/0295266 A1 Sep. 26, 2019

(30) Foreign Application Priority Data
May 20, 2016 (GB) .................... 1608860.1

(51) Int. Cl.
*G06T 7/38* (2017.01)
*G06T 7/33* (2017.01)
(Continued)

(52) U.S. Cl.
CPC .............. *G06T 7/33* (2017.01); *G06T 7/30* (2017.01); *G06T 7/37* (2017.01); *G06T 7/38* (2017.01);
(Continued)

(58) Field of Classification Search
CPC .... G06T 7/33; G06T 7/30; G06T 7/37; G06T 7/38; G06T 2207/20072;
(Continued)

(56) References Cited

U.S. PATENT DOCUMENTS

| 6,246,468 B1 * | 6/2001 | Dimsdale | G01B 11/002 |
| | | | 356/4.02 |
| 6,963,825 B1 * | 11/2005 | Morikawa | G06K 9/48 |
| | | | 345/420 |

(Continued)

FOREIGN PATENT DOCUMENTS

| CN | 103810751 A | 5/2014 |
| GB | 2526342 A | 11/2015 |

OTHER PUBLICATIONS

Jagannathan et al., "Unstructured Point Cloud Matching Within Graph-theoretic and Thermodynamic Frameworks", IEEE Computer Society Conference on Computer Vision and Pattern Recognition (CVPR'05), Jun. 20-25, 2005, 8 pages.

(Continued)

*Primary Examiner* — Sheela C Chawan
(74) *Attorney, Agent, or Firm* — Nokia Technologies Oy

(57) ABSTRACT

A method comprising: providing a first 3D point cloud and a second 3D point cloud about an object obtained using different sensing techniques; removing a scale difference between the 3D point clouds based on a mean distance of points in corresponding subsets of the first and second 3D point clouds; arranging the 3D point clouds in a two-level structure, wherein a first level is a macro structure describing boundaries of the object and a second level is a micro structure consisting of supervoxels of the 3D point cloud; constructing a first graph from the first 3D point cloud and a second graph from the second 3D point cloud such that the supervoxels represent nodes of the graphs and adjacencies of the supervoxels represents edges of the graphs; matching the (Continued)

first and second graph for obtaining a transformation matrix; and registering the 3D point clouds together by applying the transformation matrix.

20 Claims, 2 Drawing Sheets

(51) Int. Cl.
*G06T 7/37* (2017.01)
*G06T 7/30* (2017.01)

(52) U.S. Cl.
CPC .............. *G06T 2207/10028* (2013.01); *G06T 2207/20072* (2013.01)

(58) Field of Classification Search
CPC ....... G06T 2207/10028; G06 2200/04; G06T 17/00; G06T 2207/20228; G06T 7/0057; G06T 7/0065; G06T 7/0073; G06T 7/0075; G06T 7/0077; G06T 7/0079; G06T 7/00511; G06T 7/0024; G06T 3/0068; G06T 7/0028; G06T 7/003; G06T 7/0034; G06K 2209/40; G06K 2209/4011; G06K 9/6202; G06K 2009/3225; G06K 9/32; G06K 9/6203; G06K 9/6212; G01B 11/25; H04N 2013/0074; H04N 2213/005; H04N 5/2226; H04N 1/40037; G06F 15/18; G06F 17/15; G06F 7/5443; G06F 17/153
USPC ....... 382/100, 151, 154, 156, 162, 168, 173, 382/181, 190, 199, 224, 232, 276, 285, 382/294, 305, 312; 345/419, 653, 660, 345/664, 679, 472, 695
See application file for complete search history.

(56) References Cited

U.S. PATENT DOCUMENTS

| | | | | |
|---|---|---|---|---|
| 8,179,393 | B2* | 5/2012 | Minear | G06T 7/30 345/419 |
| 8,290,305 | B2* | 10/2012 | Minear et al. | 382/100 |
| 8,886,387 | B1* | 11/2014 | Agarwal | G05D 1/0253 701/28 |
| 9,740,342 | B2* | 8/2017 | Paulsen | G06F 3/044 |
| 2009/0232388 | A1 | 9/2009 | Minear et al. | |
| 2010/0149178 | A1* | 6/2010 | Yokoyama | G06T 19/00 345/419 |
| 2010/0207936 | A1 | 8/2010 | Minear et al. | |
| 2013/0151210 | A1* | 6/2013 | Kallay | G06T 7/50 703/2 |
| 2013/0245828 | A1* | 9/2013 | Tateno | G06T 7/75 700/259 |

OTHER PUBLICATIONS

Theiler et al., "Globally Consistent Registration of Terrestrial Laser Scans via Graph Optimization", ISPRS Journal of Photogrammetry and Remote Sensing, vol. 109, Nov. 2015, pp. 93-119.

Mateus et al., "Articulated Shape Matching Using Laplacian Eigenfunctions and Unsupervised Point Registration", IEEE Conference on Computer Vision and Pattern Recognition, Jun. 23-28, 2008, 8 pages.

Papon et al., "Voxel Cloud Connectivity Segmentation—Supervoxels for Point Clouds", IEEE Conference on Computer Vision and Pattern Recognition, Jun. 23-28, 2013, pp. 2027-2034.

Zhou et al., "Factorized Graph Matching", IEEE Conference on Computer Vision and Pattern Recognition, Jun. 16-21, 2012, pp. 1-8.

Wohlkinger et al., "Ensemble of Shape Functions for 3D Object Classification", IEEE International Conference on Robotics and Biomimetics, Dec. 7-11, 2011, pp. 2987-2992.

Zaslavskiy et al., "A Path Following Algorithm for the Graph Matching Problem", IEEE Transactions on Pattern Analysis and Machine Intelligence, vol. 31, No. 12, Dec. 2009, pp. 2227-2242.

Besl et al., "A Method for Registration of 3-D Shapes", IEEE Transactions on Pattern Analysis and Machine Intelligence, vol. 14, No. 2, Feb. 1992, pp. 239-256.

Search Report received for corresponding United Kingdom Patent Application No. 1608860.1, dated Nov. 22, 2016, 5 pages.

International Search Report and Written Opinion received for corresponding Patent Cooperation Treaty Application No. PCT/IB2017/052777, dated Aug. 25, 2017, 13 pages.

Persad et al., "Alignment of Point Cloud DSMs from TLS and UAV Platforms", ISPRS—International Archives of the Photogrammetry, Remote Sensing and Spatial Information Sciences, vol. XL-1/W4, Aug. 30-Sep. 2, 2015, pp. 369-373.

Kim et al., "Hybrid 3D Feature Description and Matching for Multi-Modal Data Registration", IEEE International Conference on Image Processing (ICIP), Oct. 27-30, 2014, pp. 3493-3497.

Lin et al., "Scale Ratio ICP for 3D Point Clouds with Different Scales", IEEE International Conference on Image Processing, Sep. 15-18, 2013, pp. 2217-2221.

Huang et al., "A Systematic Approach for Cross-source Point Cloud Registration by Preserving Macro and Micro Structures", IEEE Transactions on Image Processing, vol. 26, No. 7, Jul. 2017, pp. 1-14.

* cited by examiner

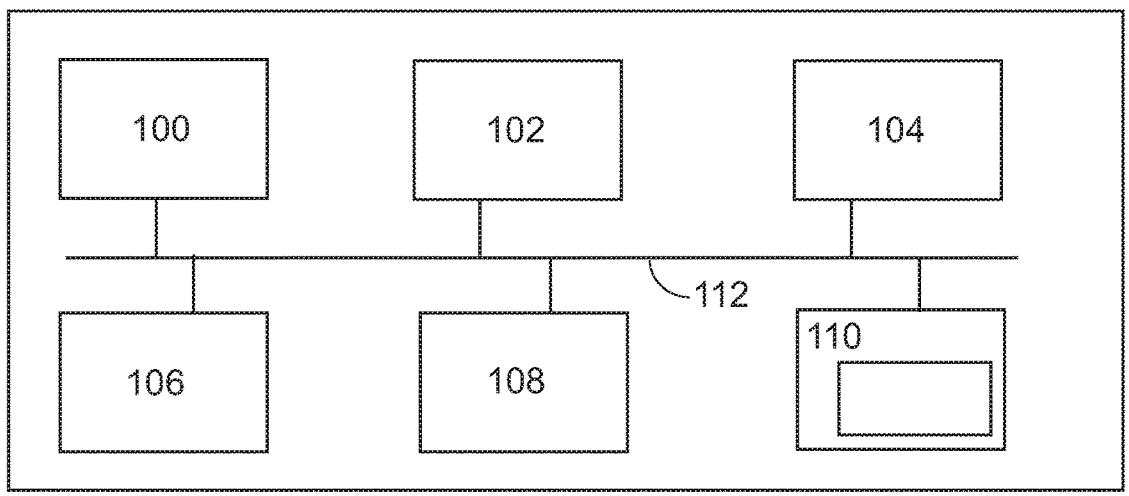

Fig. 1

Provide a first 3D point cloud obtained according to a first sensing technique about a real object underlying the first 3D point cloud, and a second 3D point cloud obtained according to a second sensing technique about said real object (200)

Remove a scale difference between the first and the second 3D point cloud based on a mean distance of points in a subset of first 3D point cloud and a corresponding subset of the second 3D point cloud (202)

Arranging the 1st and the 2nd 3D point cloud in a two-level structure, wherein a first level is a macro structure describing boundaries of the underlying object and a second level is a micro structure consisting of supervoxels comprising points of 3D point cloud clustered together (204)

Constructing a first graph from the first 3D point cloud and a second graph from the second 3D point cloud such that the supervoxels represent nodes of the graphs and adjacent relations of the supervoxels represents edges of the graphs (206)

Carry out a graph matching process between the first and second graph for obtaining a transformation matrix (208)

Register the first and the second 3D point clouds together by applying the transformation matrix (210)

Fig. 2

POINT CLOUD MATCHING METHOD

RELATED APPLICATION

This application was originally filed as Patent Cooperation Treaty Application No. PCT/IB2017/052777 filed May 11, 2017, which claims priority benefit to GB Patent Application No. 1608860.1, filed May 20, 2016.

TECHNICAL FIELD

Various embodiments relate to image processing, and more particularly to matching point clouds of different source.

BACKGROUND 3D point clouds are used in various image processing and computer vision applications. 3D point clouds are sets of data points in a 3D coordinate system typically representing an external surface of an object. 3D point clouds may be obtained by a 3D capturing device, such as a 3D scanner. A large number of points are measured on the surface of an object, and the obtained point cloud may be stored in a file.

Various sensing methods for obtaining 3D point clouds have been developed. For example, in Structure-From-Motion (SFM), three-dimensional structures are estimated from two-dimensional image sequences, where the observer and/or the objects to be observed move in relation to each other. In Light Detection And Ranging (LiDAR) method, distances are measured by illuminating an object with a laser beam and analyzing the reflected light. The resulting data is stored as point clouds.

In applications of multiple views, combining several point clouds into a global consistent data set is typically required. The problem of matching a given set of 3D point clouds with another is a challenging task in computer vision. This problem becomes even more challenging when two sets of points are yielded by different sensing techniques.

Typically, point clouds obtained by different sensing techniques may be incompatible at least in terms of scale, point density, noise and/or sampling area.

SUMMARY

Various embodiments of the invention include a method, an apparatus and a computer program, which are characterized by what is stated in the independent claims. Various embodiments of the invention are disclosed in the dependent claims.

According to a first embodiment, a method according to the invention is based on the idea of providing a first three-dimensional (3D) point cloud obtained according to a first sensing technique about a real object underlying the first 3D point cloud, and a second 3D point cloud obtained according to a second sensing technique about said real object; removing a scale difference between the first and the second 3D point cloud based on a mean distance of points in a subset of first 3D point cloud and a corresponding subset of the second 3D point cloud; arranging the first and the second 3D point cloud in a two-level structure, wherein a first level is a macro structure describing boundaries of the underlying object and a second level is a micro structure consisting of supervoxels comprising points of 3D point cloud having similar properties clustered together; constructing a first graph from the first 3D point cloud and a second graph from the second 3D point cloud such that the supervoxels represent nodes of the graphs and adjacent relations of the supervoxels represents edges of the graphs; carrying out a graph matching process between the first and second graph for obtaining a transformation matrix; and registering the first and the second 3D point clouds together by applying the transformation matrix.

According to an embodiment, the 3D point clouds are obtained using one of the following sensing technique:
  Light Detection And Ranging (LiDAR) technique;
  Structure-From-Motion (SFM) technique;
  Kinect® technique;
  Simultaneous Localization And Mapping (SLAM) method.

According to an embodiment, the method further comprises: extracting the supervoxels from the 3D point clouds by using a Voxel Cloud Connectivity Segmentation (VCCS) method for obtaining the micro structure; and constructing the macro structure on the basis of the supervoxels in the micro structure.

According to an embodiment, the method further comprises: constructing the graphs using a Factorized Graph Matching (FGM) method.

According to an embodiment, the method further comprises: adjusting the FGM method by applying a regulation term based on the neighbour points' projection difference of correspondence points.

According to an embodiment, the regulation term $J_{smooth}(X)$ is defined as $$J_{smooth}(X) = \Sigma_{i \in X} \Sigma_{j \in D} ||p_i - p_j| - |p_{im} - p_{jm}||/(n_1 * n_2),$$

where D is the connection points with point i, $p_{im}$ is the matched point of $p_i$ and $p_{jm}$ is the matched point of $p_j$.

According to an embodiment, the method further comprises: applying an Ensemble Shape Function (ESF) on the nodes of the graphs for identifying the nodes of the graphs uniquely.

According to an embodiment, the method further comprises: removing the outliers after the graph matching process to obtain the final transformation matrix.

According to an embodiment, the method further comprises: refining the regions between the 3D point clouds according to an iterative closest point (ICP) method, wherein search of similarities between the first 3D point cloud and the second 3D point cloud is carried out.

According to a second embodiment, there is provided an apparatus comprising at least one processor, memory including computer program code, the memory and the computer program code configured to, with the at least one processor, cause the apparatus to at least: provide a first three-dimensional (3D) point cloud obtained according to a first sensing technique about a real object underlying the first 3D point cloud, and a second 3D point cloud obtained according to a second sensing technique about said real object; remove a scale difference between the first and the second 3D point cloud based on a mean distance of points in a subset of first 3D point cloud and a corresponding subset of the second 3D point cloud; arrange the first and the second 3D point cloud in a two-level structure, wherein a first level is a macro structure describing boundaries of the underlying object and a second level is a micro structure consisting of supervoxels comprising points of 3D point cloud having similar properties clustered together; construct a first graph from the first 3D point cloud and a second graph from the second 3D point cloud such that the supervoxels represent nodes of the graphs and adjacent relations of the supervoxels represents edges of the graphs; carry out a graph matching process between the first and second graph for obtaining a transformation matrix; and register the first and the second 3D point clouds together by applying the transformation matrix According to a third embodiment, there is provided a computer readable storage medium stored with code thereon for use by an apparatus, which when executed by a processor, causes the apparatus to perform: providing a first three-dimensional (3D) point cloud obtained according to a first sensing technique about a real object underlying the first 3D point cloud, and a second 3D point cloud obtained according to a second sensing technique about said real object; removing a scale difference between the first and the second 3D point cloud based on a mean distance of points in a subset of first 3D point cloud and a corresponding subset of the second 3D point cloud; arranging the first and the second 3D point cloud in a two-level structure, wherein a first level is a macro structure describing boundaries of the underlying object and a second level is a micro structure consisting of supervoxels comprising points of 3D point cloud having similar properties clustered together; constructing a first graph from the first 3D point cloud and a second graph from the second 3D point cloud such that the supervoxels represent nodes of the graphs and adjacent relations of the supervoxels represents edges of the graphs; carrying out a graph matching process between the first and second graph for obtaining a transformation matrix; and registering the first and the second 3D point clouds together by applying the transformation matrix. . . .

These and other embodiments related thereto will become apparent in view of the detailed disclosure of the embodiments further below.

LIST OF DRAWINGS

In the following, various embodiments of the invention will be described in more detail with reference to the appended drawings, in which FIG. 1 shows a computer graphics system suitable to be used in a 3D point cloud analysis process according to an embodiment;

FIG. 2 shows a flow chart of a 3D point cloud matching process process according to an embodiment of the invention;

DESCRIPTION OF EMBODIMENTS

Figure 3:
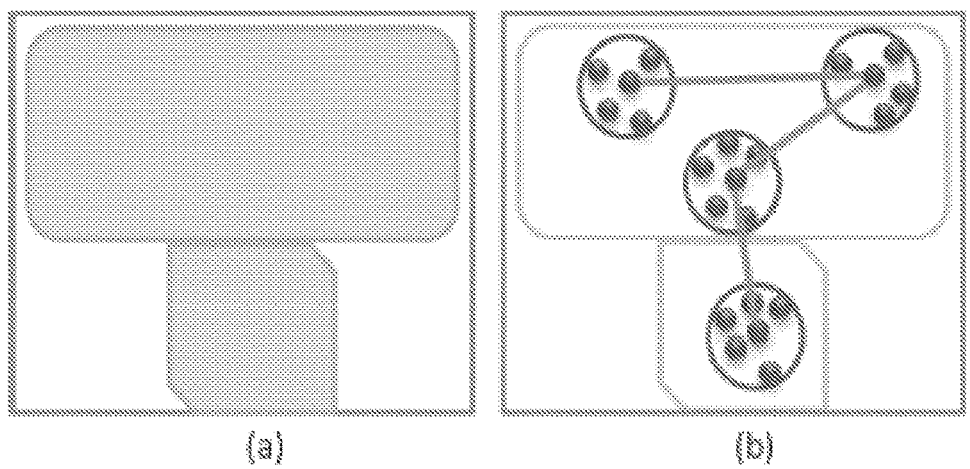
FIG. 3 shows a schematic diagram of macro and micro structures.

FIG. 1 shows a computer graphics system suitable to be used in image processing, for example in 3D point cloud analysis process according to an embodiment. The generalized structure of the computer graphics system will be explained in accordance with the functional blocks of the system. For a skilled man, it will be obvious that several functionalities can be carried out with a single physical device, e.g. all calculation procedures can be performed in a single processor, if desired. A data processing system of an apparatus according to an example of FIG. 1 includes a main processing unit 100, a memory 102, a storage device 104, an input device 106, an output device 108, and a graphics subsystem 110, which all are connected to each other via a data bus 112.

The main processing unit 100 is a conventional processing unit arranged to process data within the data processing system. The memory 102, the storage device 104, the input device 106, and the output device 108 are conventional components as recognized by those skilled in the art. The memory 102 and storage device 104 store data within the data processing system 100. Computer program code resides in the memory 102 for implementing, for example, a 3D point cloud analysis process. The input device 106 inputs data into the system while the output device 108 receives data from the data processing system and forwards the data, for example to a display. The data bus 112 is a conventional data bus and while shown as a single line it may be a combination of a processor bus, a PCI bus, a graphical bus, and an ISA bus. Accordingly, a skilled man readily recognizes that the apparatus may be any conventional data processing device, such as a computer device, a personal computer, a server computer, a mobile phone, a smart phone or an Internet access device, for example Internet tablet computer. The input data of the 3D point cloud analysis process according to an embodiment and means for obtaining the input data are described further below.

It needs to be understood that different embodiments allow different parts to be carried out in different elements. For example, various processes of the 3D point cloud analysis may be carried out in one or more processing devices; for example, entirely in one computer device, or in one server device or across multiple user devices The elements of the 3D point cloud analysis process may be implemented as a software component residing on one device or distributed across several devices, as mentioned above, for example so that the devices form a so-called cloud.

3D point clouds are used in various image processing and computer vision applications. 3D point clouds are sets of data points in a 3D coordinate system typically representing an external surface of an object. 3D point clouds may be obtained by a 3D capturing device, such as a 3D scanner. A large number of points are measured on the surface of an object, and the obtained point cloud may be stored in a file.

Various sensing methods for obtaining 3D point clouds have been developed. In Structure-From-Motion (SFM), three-dimensional structures are estimated from two-dimensional image sequences, where the observer and/or the objects to be observed move in relation to each other. The obtained geometric models are stored as 3D point clouds. In real applications, SFM uses images captured by RGB cameras to create point clouds for urban scenes and heritage objects.

In Light Detection And Ranging (LiDAR) method, distances are measured by illuminating an object with a laser beam (e.g. ultraviolet, visible, or near-infrared light) and analyzing the reflected light. The resulting data is stored as point clouds. The LiDAR point clouds may be considered a set of vertices in a three-dimensional coordinate system, wherein a vertex may be represented by a planar patch defined by a 3D vector.

Also the Microsoft Kinect® sensor can be used to obtain standard point cloud datasets.

For computer vision applications, the 3D points are typically mapped to a recognized feature of a 2D image of the object. Simultaneous localization and mapping (SLAM) of 3D point clouds refers to a problem of updating a map of an unknown environment while simultaneously localizing an observer within it.

In applications of multiple views, combining several point clouds into a global consistent data set is typically required.

The problem of matching a given set of 3D point clouds with another is a long standing open question in computer vision. This problem becomes even more challenging when two sets of points are yielded by different sensing techniques, e.g. one obtained from LiDAR while the other is obtained from Kinect.

Due to requirements of different use cases, the general task of matching point clouds can be instantiated as two concrete subtasks:

Point cloud detection. This refers to finding "subsets of the large point cloud" that are similar to the other small point cloud. The detection outcome is 3D locations; i.e. x, y, z coordinates of centers of detected subsets and r radius of spheres for covering detected subsets.

Point cloud registration. This refers to the process of establishing point-to-point correspondence between two sets of point clouds, and subsequently, deriving the transformation matrix to represent established point-to-point correspondence in a parametric manner.

Existing 3D point cloud detection and registration methods are developed to typically work with point clouds that are yielded by the same sensing technology. Cross sourced point cloud matching, however, imposes a number of challenges that often obstruct existing methods from working:

1. Scale difference: Most existing methods assume there is no significant scale change between two point clouds. This assumption, however, is not fulfilled for cross sourced point clouds. Even though a registration method is supposed to recover scale and rotation angles, exceedingly large variations in scales and angles are often out of the capture zones of many existing methods.

2. Density difference: Most existing methods assume that the two point clouds in question are of similar densities. This assumption, again, is not fulfilled for cross sourced point clouds. Usually, the LiDAR point cloud is much denser than, for example, the SFM point cloud. Large variations in densities of cross sourced point clouds often lead to the failure of existing registration methods.

3. Missing data: due to the different nature of sensing techniques, cross sourced point clouds of the same object may suffer from missing data corresponding to different parts of the object. For instance, this problem is pronounced for point clouds created by SFM as it is unable to generate points in uniform image regions.

Herein below, a novel approach for cross sourced point cloud matching is presented, which utilizes a macro and micro representations of cross sourced point clouds in registration of two cross sourced point clouds.

The method according to the embodiment is illustrated in FIG. 2. In the method, a first three-dimensional (3D) point cloud obtained according to a first sensing technique about a real object underlying the first 3D point cloud, and a second 3D point cloud obtained according to a second sensing technique about said real object (200) are provided.

A scale difference between the first and the second 3D point cloud is removed based on a mean distance of points in a subset of first 3D point cloud and a corresponding subset of the second 3D point cloud (202). The first and the second 3D point cloud are arranged in a two-level structure, wherein a first level is a macro structure describing boundaries of the underlying object and a second level is a micro structure consisting of supervoxels comprising points of 3D point cloud having similar properties clustered together (204). Then a first graph is constructed from the first 3D point cloud and a second graph is constructed from the second 3D point cloud such that the supervoxels represent nodes of the graphs and adjacent relations of the supervoxels represents edges of the graphs (206). A graph matching process is carried out between the first and second graph for obtaining a transformation matrix (208) and the first and the second 3D point clouds are registered together by applying the transformation matrix (210).

In other words, the above method may be interpreted such that it addresses challenges in cross sourced point clouds matching by simulating the operation of the human vision system. If real objects are shown as cross-sourced point clouds, our human vision system seems able to align them effortlessly to high accuracy, even if the cross sourced point clouds include large variations. The human vision system exploits the similarities between the structures of two cross-sourced point clouds rather than the detailed points. Thus, the method disclosed herein provides both the macro structure (e.g. the global outline of objects) and the micro structure (e.g. voxels and segments) of point clouds. The macro and micro structures act together like a net to robustly describe the invariant components of the cross sourced point clouds. From the mathematic viewpoint, the graph theory is a strong tool to preserve the structures. More specifically, a structure preserved representation method, regardless of point cloud details, is provided to deal with missing data and varying density.

The large variations in densities, missing data, scales and angles between two point clouds provide significant challenges for 3D cross sourced point cloud registration. To address these variations, macro and micro structures are defined to describe the point clouds. The macro structure is one of the global properties representing the outline structure of the objects or scenes. It is not the global light, global color or global material, but the global properties related to structures, for example, the outline boundary, the contour and the shape. For example, on left side of FIG. 3, the outlines of the rectangle-like area and the polygon area may be considered macro structures. When humans judge whether two objects are similar, they usually start from the macro structure.

An overall alignment is obtained based on the macro structures. On the other hand, the micro structure is one of the local properties that describe the internal details of the objects or scenes. Herein, the micro structure describes a 3D region, such as a super voxel in 3D point clouds. Similarly, on the right side of FIG. 3, the super voxels (circles) contain points with the same property of 3D spatial geometry. These micro and macro structures are used herein to iteratively obtain the corresponding relations between two point clouds.

Figure 4:
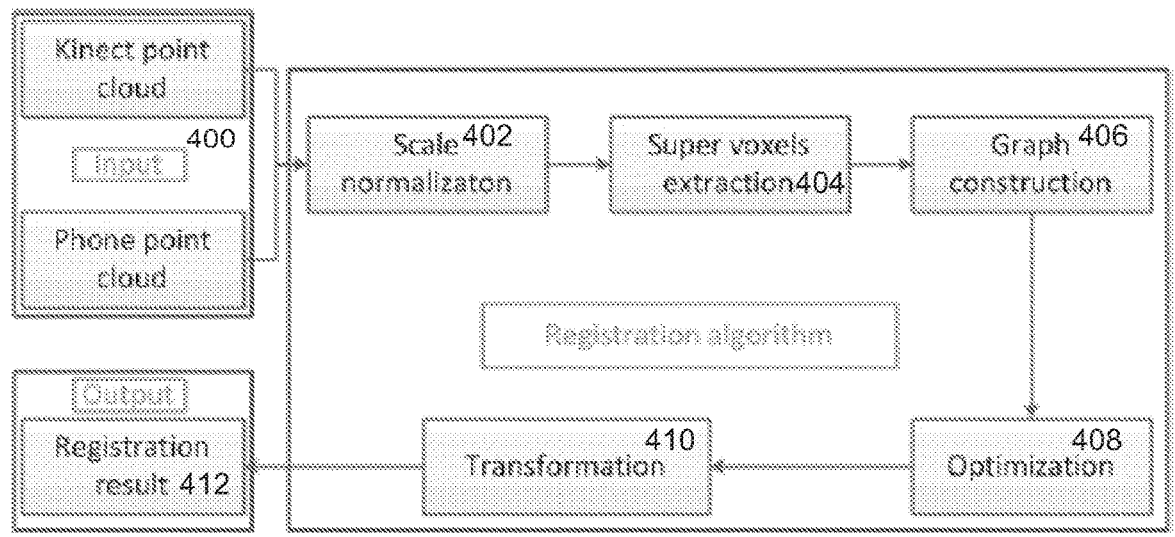
FIG. 4 shows a block chart of various units of the registration system according to an embodiment of the invention.

In the following, the registration method and various embodiments related thereto, based on the proposed macro and micro structure theory, are described more in detail, as well as the components that make up the registration system. FIG. 4 shows a block chart of various units of the registration system. As an input (400) for the registration system, two point clouds obtained using different sensing technology, such as Kinect® sensor and LiDAR technology.

Scale Normalization

As the two point clouds come from different sensors, they have different scales. To remove scale variation, scale normalization is carried out in the scale normalization unit (402) before the super voxel extraction step. It is known to measure the scales of the point clouds manually in the real world and calibrate the two point clouds on the basis of the measurements. Although accurate, manual measurements are typically slow and difficult.

According to an embodiment, the scale of the point cloud is estimated without the need for manual work by firstly computing the mean distance of points in two 3D point clouds $P_i$ and $P_j$, and computing the scale by comparing these two mean distances as follows:

$$\text{scale} = (\Sigma_{i=1}^{N} P_i)/N)/(\Sigma_{j=1}^{M} P_j)/M) \quad (1.)$$

The obtained scale can be used to transform other point clouds to remove the scale difference in cross-sourced point clouds to some extent. It is noted that while the above straightforward estimation cannot accurately remove the scale difference, it provides sufficiently accurate results for the subsequent graph matching stage by eliminating most scale differences.

Super Voxel Extraction

After the scale difference has been removed, the voxels can be extracted in the voxel extraction unit (404). Due to the large variations in cross-sourced point clouds, a method is needed to extract the invariable components. It is typical that even though the two cross-sourced point clouds may have many variations, the structure of the underlying object can still be recognized. Hence, for these cross-sourced point clouds, more emphasis is put on the structure information rather than the detailed information, because the latter is full of noise, outliers and different densities. This resembles the humans' ability to register the macro structure information at first glance and to ignore the detail information.

However, for registering accurately these two point clouds, macro structure information alone is not enough; various micro structure information is also needed. Hence, to develop an intelligent registration algorithm, a method is needed to integrate the macro and micro structure information and ensure its robustness to varying densities and missing data.

Herein, a recently developed super voxel method Voxel Cloud Connectivity Segmentation (VCCS) may be used to extract the super voxels of two point clouds. The VCCS provides an over-segmentation algorithm which uses voxel relationships to produce over-segmentations which are fully consistent with the spatial geometry of the scene in 3D, rather than projective, space. Enforcing the constraint that segmented regions must have spatial connectivity prevents label flow across semantic object boundaries which might otherwise be violated. The VCCS is disclosed more in detail in: "Voxel cloud connectivity segmentation—supervoxels for point clouds" by Papon, J., Abramov, A., Schoeler, M., Wörgötter, F., 2013 IEEE Conference on Computer Vision and Pattern Recognition (CVPR), Portland, Oreg. (Jun. 22-27, 2013).

As the VCCS method adheres to object boundaries while remaining efficient by only using the 3D geometric property, it obtains a robust results for two point clouds, regardless of different densities, angles, noise and missing data. At the same time, the results of super voxel extraction not only contain a robust object center point keeping the 3D object boundaries, but it also provides the adjacency of the super voxels.

According to an embodiment, based on the macro and micro structure definition, super voxels are used herein as micro structures. As a result, the macro structure can be constructed using the micro structures and their adjacencies. After these structures are extracted, the structures are integrated and introduced in the graph construction stage.

Graph Construction

In order to use the macro and micro structures, the graph construction unit (406) applies a new graph construction method. The graph incorporates elements, which separately describe a part of the point cloud, into a connected structure. A graph is a strong tool for maintaining the macro structure property (e.g., topology). At the same time, the nodes and the edges of the graph maintain the micro structure properties. Hence, the graph is used to keep the macro and micro structures of a point cloud together. According to an embodiment, super voxels and their adjacencies are used to construct the graphs, wherein each super voxel and its connected adjacent edges represent the micro structures, whereas the whole graphs represent the macro structures.

A graph with n nodes and m directed edges is defined as $C=\{P, Q, G\}$. P and Q are the features for the nodes and edges of the graph, which are defined as $P=[p_1, \ldots, p_n] \varepsilon R^{d_p \times n}$ and $Q=[q_1, \ldots, q_m] \varepsilon R^{d_p \times m}$, respectively, where $R^{d_p \times n}$ is a high-dimensional vector space with $d_p$ the length of feature vector and n the number of feature vectors. $R^{d_p \times m}$ is defined in a similar manner for graph edges. For example, $p_i$ could be a SIFT (Scale-Invariant Feature Transform) descriptor or ESF (Ensemble Shape Function) descriptor extracted from the original data around the $i^{th}$ node and $q_i$ could be the length of the $i^{th}$ edge. $G \varepsilon \{0,1\}^{n \times m}$ is a node-edge incidence matrix, which describes the topology of the graph. It may be defined that $g_{ic}=g_{jc}=1$ if the $c_{th}$ edge connect the $i^{th}$ node and the $j^{th}$ node, and zero otherwise.

Herein, a graph matching method disclosed in: "Factorized graph matching" by Zhou, F., De la Torre, F., 2012 IEEE Conference on Computer Vision and Pattern Recognition (CVPR), pp. 127-134, could be utilized. As a brief review of factorized graph matching (FGM) method, let us suppose that there is a pair of graphs, $C_1=\{P_1, Q_1, G_1\}$ and $C_2=\{P_2, Q_2, G_2\}$. The problem of graph matching consists of finding a correspondence between the nodes of $C_1$ and $C_2$ that maximizes the following score of global consistency:

$$J(X) = \sum_{i1i2} x_{i1i2} k_{i1i2}^P + \sum_{\substack{i1 \neq i2, j1 \neq j2 \\ g_{i1c1}^1 g_{j1c1}^1 = 1 \\ g_{i2c2}^2 g_{j2c2}^2 = 1}} x_{i1i2} x_{j1j2} k_{c1c2}^q \quad (2.)$$

where $X \varepsilon \{0, 1\}^{n1 \times n2}$ denotes the node correspondence. For example, if $i^{th}_1$ node of $C_1$ and $i^{th}_2$ node of $C_2$ correspond, then $x_{i1i2}=1$. $k^P_{i1i2}$ is an element of $K_p$ in $i^{th}_1$ row and $i^{th}_2$ column, and $k^q_{c1,c2}$ is an element of $K_q$ in $c^{th}_1$ row and $c^{th}_2$ column. It is more convenient to write $J(X)$ in a quadratic form, $x^T K x$, where $x = \text{vec}(X) \{0, 1\}^{n1n2}$ is an indicator vector and $K \varepsilon R^{n1n2 \times n1n2}$ is computed as follows:

$$k_{i1i2j1j2}^P = \begin{cases} k_{i1i2}^P & \text{if } i_1 = j_1 \text{ and } i_2 = j_2 \\ k_{c_1c_2}^q & \text{if } i_1 \neq j_1 \text{ and } i_2 \neq j_2 \text{ and } g_{i_1c_1}^1 g_{j_1c_1}^1 g_{i_2c_2}^2 g_{j_2c_2}^2 = 1 \\ 0 & \text{otherwise} \end{cases} \quad (3.)$$

To develop an initial-free and no accuracy loss optimization scheme to address the non-convex issue, the above-mentioned factorized graph matching (FGM) method is used. It divides matrix K into many smaller matrices. Using these smaller matrices, the graph matching optimization problem can be transformed into iteratively optimizing the following non-liner problem:

$$\max J_\alpha(X) = (1-\alpha) J_{vex}(X) + \alpha J_{cav}(X) \quad (4.)$$

where $J_{vex}$ and $J_{cav}$ are two relaxations in the above method.

For using the above method, P and Q need first to be defined. Secondly, two affinity matrices, $K_p \varepsilon R^{n1 \times n2}$ and $K_q \varepsilon R^{m1 \times m2}$ are computed to measure the similarity of each node and edge pair, respectively. More specifically, $k^P_{i1i2}=\Phi_p(p^1_{i1}, p^2_{i2})$ measures the similarity between the $i^{th}_1$ node of $C_1$ and the $i^{th}_2$ node of $C_2$, and $k^q_{c1c2}=\Phi_q(c^1_{i1}, c^2_{i2})$ measures the similarity between the $c^{th}_1$ edge of $C_1$ and the $c^{th}_2$ edge of $C_2$.

In order to robustly represent the micro structures of point clouds, the large variations in densities and missing data should be taken into account. Hence, according to an embodiment, the super voxels of two point clouds are extracted and the centroid points of each super voxel are extracted, as well. The graph node E is constituted by these points.

In order to correctly match these nodes, the nodes need to be described discriminatingly. For that purpose a global descriptor Ensemble Shape Function (ESF) is used, which adds up the properties of distances, angles and area of the point clouds. The Ensemble Shape Function (ESF) is described more in detail for example in "Ensemble of shape functions for 3D object classification," by W. Wohlkinger and M. Vincze in 2011 IEEE International Conference on Robotics and Biomimetics (ROBIO), 2011, pp. 2987-2992. The ESF can be applied to build correspondence relations by combination with the micro structures.

Figure 5:
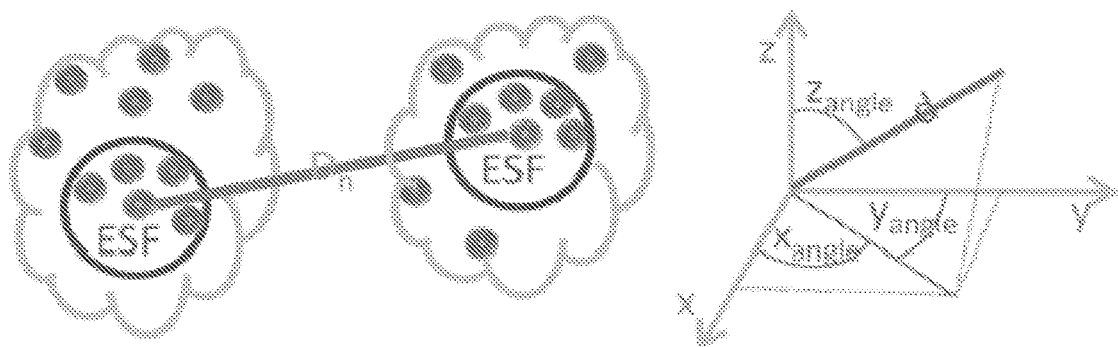
FIG. 5 shows a schematic diagram of graph nodes and edges.

A node similarity matrix Kp can be computed by comparing the distance of the nodes' ESF descriptors. In order to keep the 3D geometric property, the Euclidian distance of two reference points is added and these two distances are combined using a weight, which is illustrated on the left side of FIG. 5. As such distances may have different numeric scales, the distances are firstly normalized and then the final similarity distance is computed using the following formulation:

$$K_p = \omega_n * D_{esf} + (1-\omega_n) * D_n \quad (5.)$$

where $\omega_n$ is the weight. $D_{esf}$ is the normalized distance of two 3D points' ESF descriptors, $D_{esf} = D_{esf}/\max(\max(D_{esf}))$. $D_n$ is the normalized distance of two 3D points' Euclidian distance, and $D_n = D_n/\max(D_n)$.

In order to robustly and discriminately describe the point cloud, the edges need to be built accurately to reject the macro structure of the point clouds. The adjacent relations extracted by the VCSS method above are recorded between super voxels and the adjacent relations are used as the edges Q. The adjacent relations correctly reject the relations of the super voxels through the boundary property. In order to correctly match the edges, the edges need to be described discriminatingly and meaningfully. Herein, the spatial distance and geometry properties of the edges are used, as illustrated in the right side of FIG. 5. More specifically, the Euclidean distance and Eular angles of two connected nodes are combined to construct a descriptor vector for describing the edges ($x_{angle}$, $y_{angle}$, $z_{angle}$, d), where $d=|P_i-P_j|_2$, $z_{angle}=a\cos(z/d)$, $x_{angle}=a\cos(x/(d*\sin(z_{angle})))$, $y_{angle}=a\cos(y/(d*\sin(z_{angle})))$. The similarity can be estimated by comparing the similarity of these edges' descriptors, thereby obtaining $D_e$. In order to undertake a more robust comparison, the descriptor $D_e$ is normalized, i.e. $D_e=D_e/\max(D_e)$. So, the edge similarity matrix Q is computed by $$K_q = D_e \quad (6.)$$

Optimization

The equation 4 defines how the FGM method transforms the graph matching optimization problem into iteratively optimized non-linear function. Although the FGM uses a different a iteratively to avoid the problem of a local minima in graph matching, equation 4 cannot address the problem completely.

According to an embodiment, the optimization unit (408) may apply a regulation term which considers the macro structure to the FGM method to effectively deal with the problem of local minima. Thus, the improved energy function can be defined as:

$$\max J_\alpha(X) = (1-\alpha)J_{vex}(X) + \alpha J_{cav}(X) + J_{smooth}(X) \quad (7.)$$

As the underlying registration problem only has rigid rotation and translation, the rigid transformation relations always have neighbor projection errors nearby. This property can be used to avoid the local minima and to obtain more accurate transformation relations. The regulation term may be defined by considering the neighbors' projection difference of correspondence points. $J_{smooth}(X)$ may be defined as $$J_{smooth}(X) = \Sigma_{i \varepsilon X} \Sigma_{j \varepsilon D} ||p_i - p_j| - |p_{im} - p_{jm}||/(n_1 * n_2) \quad (8.)$$

where D is the connection points with point i, $p_{im}$ is the matched point of $p_i$ and $p_{jm}$ is the matched point of $p_j$. These points can be easily obtained in D by searching matrix G in the graph.

To optimize this nonlinear problem, the so-called Frank-Wolf (FW) method, disclosed in: "A path following algorithm for the graph matching problem", by Zaslavskiy, M., Bach, F., Vert, J. P. in IEEE Transactions on Pattern Analysis and Machine Intelligence, 31(12), pp. 2227-2242 (2009), can be used. The FW iteratively updates the solution of $X^* = X + \lambda Y$. Given an initial $X_0$, X can be updated through optimal direction Y and step size $\lambda$. As the regulation term $J_{smooth}(X)$ needs a correspondence relation, the computation of optimal direction Y is divided, according to an embodiment, into two steps:

compute initial $Y_0$ by using $J_{vex}$ and $J_{cav}$. Herein, an initial $Y_0$ may be computed by solving the Hungarian algorithm which is linear programming similar to the FGM method.

compute the final Y by using $J_{vex}$, $J_{cav}$ and $J_{smooth}$. The energy of the regulation term $J_{smooth}(X)$ can be computed using $Y_0$ and the final Y is obtained using the new energy.

As the computation of Y involves linear programming, adding one more computation step of Y is not computationally costly. Similar to the strategy of FGM, 100 times iteration can be used to discard the inferior temporary solution and compute an alternate one by another FW step to optimize J(X).

Transformation Estimation

After optimization, the final transformation matrix is computed in the transformation unit (410). The output of the method is to registration of the two cross-sourced point clouds together (412). However, the results of graph matching may sometimes contain a few outliers, which make the results non-optimal for directly computing the transformation matrix, which is used to combine two point clouds into a coordinate system.

Thus, according to an embodiment, the method may further comprise an optional step of removing the outliers to obtain the final transformation matrix. According to an embodiment, an estimation method, for example a RANSAC (RANdom SAmple Consensus) method, is adopted to remove the outliers. After the outliers are removed, the transformation matrix can be computed and the transformation may be performed for the point clouds.

Moreover, even after the removal of the outliers, the transformation matrix may still contain small errors. According to an embodiment, the method further comprises refining the regions between the 3D point clouds according to an iterative closest point (ICP) method, wherein search of similarities between the first 3D point cloud and the second 3D point cloud is carried out.

The iterative closest point (ICP) method is commonly used for registration and gains success in many fields such as mobile robots, medical imaging and 3D-map. The iterative closest point (ICP) method is disclosed more in detail for example in "A method for registration of 3-D shapes," by P. J. Besl and H. D. McKay, IEEE Trans. Pattern Anal. Mach. Intell., vol. 14, no. 2, pp. 239-256, February 1992.

These optional steps may be carried out in the transformation unit (412) before the two cross-sourced point clouds are registered together.

A skilled person appreciates that any of the embodiments described above may be implemented as a combination with one or more of the other embodiments, unless there is explicitly or implicitly stated that certain embodiments are only alternatives to each other.

As confirmed by the experiments, the various embodiments may provide advantages over state of the art. The disclosed approach preserves the structure properties well by firstly describing the point clouds' structures as graphs, and secondly finding the optimal graph-matching solution. According to some embodiments, the results can be refined by applying 3D RANSAC to remove outliers and ICP to finalize the outlier-free registration.

The various embodiments of the invention can be implemented with the help of computer program code that resides in a memory and causes the relevant apparatuses to carry out the invention. For example, an apparatus may comprise circuitry and electronics for handling, receiving and transmitting data, computer program code in a memory, and a processor that, when running the computer program code, causes the terminal device to carry out the features of an embodiment.

It is obvious that the present invention is not limited solely to the above-presented embodiments, but it can be modified within the scope of the appended claims.

The invention claimed is:

1. A method comprising:
providing a first three-dimensional (3D) point cloud obtained according to a first sensing technique about an object underlying the first 3D point cloud, and a second 3D point cloud obtained according to a second sensing technique about said object;
removing a scale difference between the first 3D point cloud and the second 3D point cloud based on a mean distance of points in a subset of the first 3D point cloud and a corresponding subset of the second 3D point cloud;
arranging the first 3D point cloud and the second 3D point cloud in a two-level structure, wherein a first level is a macro structure describing boundaries of said object and a second level is a micro structure consisting of supervoxels comprising points of 3D point cloud having similar properties clustered together;
constructing a first graph from the first 3D point cloud and a second graph from the second 3D point cloud such that the supervoxels represent nodes of the first graph and the second graph and adjacent relations of the supervoxels represents edges of the first graph and the second graph;
carrying out a graph matching process between the first graph and the second graph for obtaining a transformation matrix; and registering the first 3D point cloud and the second 3D point cloud substantially together by applying the transformation matrix.

2. The method according to claim 1, wherein the first 3D point and the second 3D point cloud are obtained by using one of the following sensing technique:
light detection and ranging (LiDAR) technique;
structure-from-motion (SFM) technique; or
simultaneous localization and mapping (SLAM) method.

3. The method according to claim 1 further comprising:
extracting the supervoxels from the first 3D point cloud and the second 3D point cloud by using a voxel cloud connectivity segmentation (VCCS) method for obtaining the micro structure; and
constructing the macro structure on the basis of the supervoxels in the micro structure.

4. The method according to claim 1 further comprising:
constructing the first graph and the second graph using a factorized graph matching (FGM) method.

5. The method according to claim 4 further comprising:
adjusting the FGM method by applying a regulation term ($J_{smooth}$ (X)) based on a neighbour points' projection difference of correspondence points.

6. The method according to claim 5, wherein the regulation term $J_{smooth}(X)$ is defined as:

$$J_{smooth}(X)=\Sigma_{i \in X}\Sigma_{j \in D}||p_i-p_j|-|p_{im}-p_{jm}||/(n_1*n_2),$$

where D is the connection points with point i, $p_{im}$ is the matched point of a $i^{th}$ node $p_i$ of the first graph and $p_{jm}$ is the matched point of a $j^{th}$ node $p_j$ of the second graph, and $n_1$ and $n_2$ are numbers of feature vectors in the first graph and in the second graph, respectively.

7. The method according to claim 1 further comprising:
applying an ensemble shape function (ESF) on the nodes of the first graph and the second graph for uniquely identifying nodes of the first graph and the second graph.

8. The method according to claim 1 further comprising:
removing outliers after the graph matching process to obtain the transformation matrix.

9. The method according to claim 1 further comprising:
refining regions between the 3D point clouds according to an iterative closest point (ICP) method, wherein search of similarities between the first 3D point cloud and the second 3D point cloud is carried out.

10. An apparatus comprising at least one processor, memory including computer program code, the memory and the computer program code configured to, with the at least one processor, cause the apparatus to at least:
provide a first three-dimensional (3D) point cloud obtained according to a first sensing technique about an object underlying the first 3D point cloud, and a second 3D point cloud obtained according to a second sensing technique about said object;
remove a scale difference between the first 3D point cloud and the second 3D point cloud based on a mean distance of points in a subset of the first 3D point cloud and a corresponding subset of the second 3D point cloud;
arrange the first 3D point and the second 3D point cloud in a two-level structure, wherein a first level is a macro structure describing boundaries of said object and a second level is a micro structure consisting of supervoxels comprising points of 3D point cloud having similar properties clustered together;
construct a first graph from the first 3D point cloud and a second graph from the second 3D point cloud such that the supervoxels represent nodes of the first graph and the second graph and adjacent relations of the supervoxels represents edges of the first graph and the second graph;

carry out a graph matching process between the first graph and the second graph for obtaining a transformation matrix; and register the first 3D point cloud and the second 3D point clouds substantially together by applying the transformation matrix.

11. The apparatus according to claim 10, wherein the first 3D point cloud and the second 3D point cloud are obtained by using one of the following sensing technique:
light detection and ranging (LiDAR) technique;
structure-from-motion (SFM) technique; or
simultaneous localization and mapping (SLAM) method.

12. The apparatus according to claim 10 further comprising computer program code configured to cause the apparatus to:
extract the supervoxels from the first 3D point cloud and the second 3D point cloud by using a voxel cloud connectivity segmentation (VCCS) method for obtaining the micro structure; and
construct the macro structure on the basis of the supervoxels in the micro structure.

13. The apparatus according to claim 10 further comprising computer program code configured to cause the apparatus to:
construct the first graph and the second graph using a factorized graph matching (FGM) method.

14. The apparatus according to claim 13 further comprising computer program code configured to cause the apparatus to:
adjust the FGM method by applying a regulation term ($J_{smooth}$ (X)) based on a neighbour points' projection difference of correspondence points.

15. The apparatus according to claim 14, wherein the regulation term $J_{smooth}$ (X) is defined as $$J_{smooth}(X)=\Sigma_{i \in X}\Sigma_{j \in D}\||p_i-p_j|-|p_{im}-p_{jm}\||/(n_1 * n_2),$$

where D is the connection points with point i, $p_{im}$ is the matched point of a $i^{th}$ node $p_i$ of the first graph and $p_{jm}$ is the matched point of a $j^{th}$ node $p_j$ of the second graph, and $n_1$ and $n_2$ are numbers of feature vectors in the first graph and in the second graph, respectively.

16. The apparatus according to claim 10 further comprising computer program code configured to cause the apparatus to:
apply an ensemble shape function (ESF) on the nodes of the first graph and the second graph for uniquely identifying nodes of the graphs.

17. The apparatus according to claim 10 further comprising computer program code configured to cause the apparatus to:
remove outliers after the graph matching process to obtain the transformation matrix.

18. The apparatus according to claim 10 further comprising computer program code configured to cause the apparatus to:
refine regions between the 3D point clouds according to an iterative closest point (ICP) method, wherein search of similarities between the first 3D point cloud and the second 3D point cloud is carried out.

19. A non-transitory computer readable medium comprising program instructions for causing an apparatus to perform at least the following:
providing a first three-dimensional (3D) point cloud obtained according to a first sensing technique about an object underlying the first 3D point cloud, and a second 3D point cloud obtained according to a second sensing technique about said object;
removing a scale difference between the first 3D cloud and the second 3D point cloud based on a mean distance of points in a subset of the first 3D point cloud and a corresponding subset of the second 3D point cloud;
arranging the first 3D cloud and the second 3D point cloud in a two-level structure, wherein a first level is a macro structure describing boundaries of said object and a second level is a micro structure consisting of supervoxels comprising points of 3D point cloud having similar properties clustered together;
constructing a first graph from the first 3D point cloud and a second graph from the second 3D point cloud such that the supervoxels represent nodes of the first graph and the second graph and adjacent relations of the supervoxels represents edges of the first graph and the second graph;
carrying out a graph matching process between the first graph and the second graph for obtaining a transformation matrix; and
registering the first 3D cloud and the second 3D point cloud substantially together by applying the transformation matrix.

20. The non-transitory computer readable medium of claim 19, wherein the first 3D point and the second 3D point cloud are obtained by using one of the following sensing technique:
light detection and ranging (LiDAR) technique;
structure-from-motion (SFM) technique; or
simultaneous localization and mapping (SLAM) method.

* * * * *